United States Patent [19]

Miale et al.

[11] Patent Number: 4,500,419

[45] Date of Patent: Feb. 19, 1985

[54] CATALYSIS OVER ACTIVATED ZEOLITES

[75] Inventors: Joseph N. Miale, Lawrenceville; Clarence D. Chang, Princeton, both of N.J.

[73] Assignee: Mobil Oil Corporation, New York, N.Y.

[21] Appl. No.: 552,541

[22] Filed: Nov. 16, 1983

Related U.S. Application Data

[63] Continuation-in-part of Ser. No. 355,413, Mar. 8, 1982, Pat. No. 4,427,787.

[51] Int. Cl.$^3$ ............... C10G 11/05; C10G 11/08; C10G 45/54

[52] U.S. Cl. ............... 208/115; 208/120; 585/408; 585/415; 585/467; 585/470; 585/475; 585/481; 585/654

[58] Field of Search ............... 208/111, 120, 118, 119, 208/109, 110, 115

[56] References Cited

U.S. PATENT DOCUMENTS

| | | | |
|---|---|---|---|
| 3,442,794 | 5/1969 | Van Helden | 208/111 |
| 3,549,518 | 12/1970 | Mason et al. | 208/111 |
| 3,575,887 | 4/1971 | Wilson | 208/111 |
| 3,702,312 | 11/1972 | Wilson | 502/63 |
| 4,054,511 | 10/1977 | Miale et al. | 208/120 |
| 4,374,296 | 2/1983 | Haag et al. | 585/739 |

FOREIGN PATENT DOCUMENTS 2079737  1/1982  United Kingdom .

Primary Examiner—Delbert E. Gantz
Assistant Examiner—O. Chaudhuri
Attorney, Agent, or Firm—Alexander J. McKillop; Michael G. Gilman; Dennis P. Santini

[57] ABSTRACT

A process is provided for conducting organic compound conversion over a catalyst composition comprising a supported crystalline zeolite having a high initial silica-to-alumina mole ratio, said supported zeolite being prepared by compositing said crystalline zeolite with alumina, reacting the composite with a particular hydrogen fluoride solution in a specified way, drying the hydrogen fluoride reacted composite, treating the dried composite by hydrolysis, ammonolysis and/or by contact with an ammonium salt solution, and calcining the resulting material.

19 Claims, No Drawings

CATALYSIS OVER ACTIVATED ZEOLITES

CROSS-REFERENCE TO RELATED CASES

This application is a continuation-in-part of application Ser. No. 355,413, filed Mar. 8, 1982, now U.S. Pat. No. 4,427,787.

BACKGROUND OF THE INVENTION

1. Field of the Invention

This invention relates to a process for conducting organic compound conversion over a catalyst comprising a synthetic crystalline zeolite, including a high silica-containing synthetic crystalline material, said zeolite having been treated by a method which involves the sequential steps of compositing same with a support matrix of alumina, reacting the resulting composite with hydrogen fluoride, treating the hydrogen fluoride reacted composite by contact with a solution of an ammonium salt, by hydrolysis and/or ammonolysis, and calcining the resulting material. The resulting supported zeolite composition for use as a catalyst component herein exhibits enhanced Bronsted acidity.

2. Description of Prior Art

Zeolite materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejection those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework SiO$_4$ and AlO$_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated convenient symbols, as illustrated by zeolite ZSM-5 (U.S. Pat. No. 3,702,886).

High silica-containing synthetic zeolites are well known in the art and it is generally accepted that the ion exchange capacity of the crystalline zeolite is directly dependent on its aluminum content. Thus, for example, the more aluminum there is in a crystalline structure, the more cations are required to balance the electronegativity thereof, and when such cations are of the acidic type such as hydrogen, they permit tremendous catalytic activity to the crystalline material. On the other hand, high silica-containing zeolites having little or substantially no aluminum, have many important properties and characteristics and a high degree of structural stability such that they have become candidates for use in various processes including catalytic processes. Materials of this type are known in the art and include high silica-containing aluminosilicates such as ZSM-5, ZSM-11 (U.S. Pat. No. 3,709,979), and ZSM-12 (U.S. Pat. No. 3,832,449) to mention a few.

The silica-to-alumina ratio of a given zeolite is often variable; for example, zeolite X (U.S. Pat. No. 2,882,244) can be synthesized with a silica-to-alumina ratio of from 2 to 3; zeolite Y (U.S. Pat. No. 3,130,007) from 3 to about 6. In some zeolites, the upper limit of silica-to-alumina ratio is virtually unbounded. Zeolite ZSM-5 is one such material wherein the silica-to-alumina ratio is at least 5. U.S. Pat. No. 3,941,871 discloses a crystalline metal organo silicate essentially free of aluminum and exhibiting an x-ray diffraction pattern characteristic of ZSM-5 type aluminosilicate. U.S. Pat. Nos. 4,061,724; 4,073,865 and 4,104,294 describe microporous crystalline silicas or organo silicates wherein the aluminum content present is at impurity levels.

Because of the extremely low aluminum content of these high silica-containing synthetic zeolites, their ion exchange capacity is not as great as materials with a higher aluminum content. Therefore, when these materials are contacted with an acidic solution and thereafter are processed in a conventional manner, they are not as catalytically active as their higher aluminum-containing counterparts.

The method for altering the activity of the zeolite catalyst component for use herein permits the preparation of certain synthetic high silica-containing materials which have all the desirable properties inherently possessed by such high silica materials and, yet, have an acid activity which heretofore has only been possible to be achieved by materials having a higher aluminum content in their "as synthesized" form. It further permits valuable activation of crystalline zeolites having much lower silica-to-alumina mole ratios.

It is noted that U.S. Pat. Nos. 3,354,078 and 3,644,220 relate to treating crystalline aluminosilicates with volatile metal halides. Neither of these latter patents is, however, concerned with treatment of crystalline materials having a high silica-to-alumina mole ratio or with treatment of any crystalline zeolite with hydrogen fluoride in the present manner. In fact, the use of hydrogen fluoride with aluminosilicates has been avoided because of resulting lattice damage. Hydrogen fluoride in high concentrations, e.g. 5N or greater, readily attacks both silica and alumina. Lower concentrations may also damage lattice structures if contact is maintained for too long a time. With some zeolitic materials, hydrogen fluoride treatment under controlled conditions has been used to alter pore size. U.S. Pat. No. 3,997,474 and 4,054,511 relate to altering effective pore size of natural ferrierite ore with very dilute hydrogen fluoride treatment. However, the same treatment of erionite resulted in a large loss in activity and crystallinity.

SUMMARY OF THE INVENTION

The present invention relates to a novel process for converting organic compounds over a catalyst comprising a synthetic crystalline aluminosilicate zeolite, including a high silica-containing synthetic crystalline zeolite, of altered activity resulting from sequential treatment steps of compositing the zeolite, either "as synthesized" or initially ion-exchanged, with a support matrix material of alumina, reacting the resulting composite with a dilute aqueous solution of hydrogen fluoride (e.g. less than 5 weight percent HF) for a time of less than about one hour, treating the hydrogen fluoride reacted composite by contact with an ammonium salt solution, by hydrolysis and/or ammonolysis, and calcining the resulting material. The resulting material exhibits enhanced Bronsted acidity and, therefore, improved acid activity toward catalysis of numerous chemical reactions, such as, for example, cracking of organic, e.g. hydrocarbon, compounds. DESCRIPTION OF SPECIFIC EMBODIMENTS This is a continuation-in-part of the application resulting in U.S. Pat. No. 4,427,787, the entire teaching of which is incorporated herein by reference.

The expression "high silica-containing crystalline material" is intended to define a crystalline structure which has an initial silica-to-alumina ratio greater than 100 and more preferably greater than 500, up to and including those highly siliceous materials where the initial silica-to-alumina ratio is infinity or as reasonably close to infinity as practically possible. This latter group of highly siliceous materials is exemplified by U.S. Pat. Nos. 3,941,871; 4,061,724; 4,073,865 and 4,104,294 wherein the materials are prepared from reaction solutions which involve no deliberate addition of aluminum. However, trace quantities of aluminum are usually present due to the impurity of the synthesis reaction solutions. It is to be understood that the expression "high silica-containing crystalline material" also specifically includes those materials which have other metals besides silica and/or alumina associated therewith, such as boron, iron, chromium, etc. Thus, the starting materials utilized in the novel process of this invention may have an initial silica-to-alumina ratio greater than about 100 (irrespective of what other materials or metals are present in the crystal structure).

The synthetic zeolite starting materials utilized herein, including those having an initial silica-to-alumina mole ratio greater than about 100, may be prepared from reaction mixtures containing sources of various cations. The present process provides noted improvement regardless of which cation sources are present in said reaction mixtures. Non-limiting examples of cation sources to be used in the manufacture of the zeolite starting materials include amines, diamines, pyrrolidine, onium compounds and compounds containing multiple cationic centers. Examples of onium compounds are those having the following formula:

$$R_4M^+X^-$$

wherein R is alkyl of from 1 to 20 carbon atoms, heteroalkyl of from 1 to 20 carbon atoms, aryl, heteroaryl, cycloalkyl of from 3 to 6 carbon atoms, cycloheteroalkyl of from 3 to 6 carbon atoms, or combinations thereof; M is a quadricoordinate element (e.g. nitrogen, phosphorus, arsenic, antimony or bismuth) or a heteroatom (e.g. N, O, S, Se, P, As, etc.) in an alicyclic, heteroalicyclic or heteroaromatic structure; and X is an anion (e.g. fluoride, chloride, bromide, iodide, hydroxide, acetate, sulfate, carboxylate, etc.). When M is a heteroatom in an alicyclic, heteroalicyclic or heteroaromatic structure, such structure may be, as non-limiting examples,

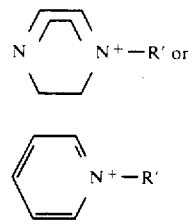

wherein R' is alkyl of from 1 to 20 carbon atoms, heteroalkyl of from 1 to 20 carbon atoms, aryl, heteroaryl, cycloalkyl of from 3 to 6 carbon atoms or cycloheteroalkyl of from 3 to 6 carbon atoms.

The compounds containing multiple cationic centers include those having the formula:

$$[(R)_3M^+(Z)_nM^+(R)_3](X^-)_2$$

wherein R, M and X are as above defined, Z is a bridging member selected from the group consisting of alkyl of from 1 to 20 carbon atoms, alkenyl of from 2 to 20 carbon atoms, aryl, heteroalkyl of from 1 to 20 carbon atoms, heteroalkenyl of from 2 to 20 carbon atoms and heteroaryl, and n is a number of from 1 to about 50. Non-limiting examples of such multiple cationic center containing compounds include:

$$[(CH_3)_3As^+(CH_2)_6N^+(CH_3)_3](Cl^-)_2,$$

$$[(C_3H_7)_3N^+(CH_2)_{10}N^+(C_3H_7)_3](Cl^-)_2,$$

$$[(C_6H_5)_3N^+(C_2H_4)_{16}P^+(C_6H_5)_3](OH^-)_2,$$

$$[(C_{18}H_{37})_3P^+(C_2H_2)_3P^+(CH_3)_3](Cl^-)_2,$$

$$[(C_2H_5)_3N^+(C_6H_4)N^+(C_2H_5)_3](Br^-)_2,$$

$$[(CH_3)_3Sb^+(CH_2)_{10}Sb^+(CH_3)_3](Cl^-)_2,$$

$$[(C_6H_5)_3Sb^+(CH_2)_4N^+(CH_3)_3](OH^-)_2,$$

$$[(CH_3)_3Bi^+(CH_2)_{18}N^+(CH_3)_3](Br^-)_2,$$

$$[(C_2H_3)_3N^+(CH_2)_{50}N^+(C_2H_3)_3](OH^-)_2,$$

$$[(C_6H_5)_3P^+(C_2H_2)_6As^+(CH_3)_3](Cl^-)_2,$$

$$[(CH_3)_3N^+(CH_2)_6N^+(CH_3)_3](Cl^-)_2, \text{ and}$$

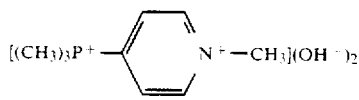

The process of treating the zeolite for use herein is simple and easy to carry out although the results therefrom are dramatic. It is carried out by compositing the crystalline zeolite material with an alumina support matrix material and, in a preferred embodiment forming an extrudate of same, reacting the composite or extrudate with a dilute aqueous solution of hydrogen fluoride of from about 0.1 to about 5 Normal, said reaction being conducted at a temperature of from about 0° C. to about 30° C., preferably at about ambient temperature, for a time of less than about 60 minutes, preferably from about 10 minutes to less than about 60 minutes. The hydrogen fluoride reacted composite or extrudate is dried, usually by heating to about 130° C., and then treated (1) by contact with an ammonium salt solution, e.g. 1N NH$_4$NO$_3$, (2) by hydrolysis and/or (3) by ammonolysis, and thereafter calcined at a temperature of from about 200° C. to about 600° C. in an inert atmosphere of air, nitrogen, etc. at subatmospheric, atmospheric or superatmospheric pressures for from about 1 minute to about 48 hours.

The amount of hydrogen fluoride which is utilized is from about 0.02 to about 0.2 grams of hydrogen fluoride per gram of crystalline zeolite material in the composite or extrudate.

If the treatment step following hydrogen fluoride reaction is an ammonium salt solution contacting step, it may be conducted for a period of time of from about 1 hour to about 20 hours at a temperature of from about 0° C. to about 90° C. The ammonium salt used is not narrowly critical and will normally be an inorganic salt such as ammonium nitrate, ammonium sulfate, ammonium chloride, etc. If the ammonium salt solution is aqueous, it will be from about 0.1 to about 5 Normal, preferably about 1 Normal.

If the treatment step following hydrogen fluoride reaction involves hydrolysis, the extrudate will be contacted with water at a temperature of from about 20° C. to about 550° C. When the hydrolyzing temperature is below 100° C., liquid water will be used. When the boiling point of water is exceeded, the extrudate may be purged with water saturated gas, e.g. helium.

If the treatment step following hydrogen fluoride reaction involves ammonylsis, the composite or extrudate will be contacted with 0.1 to 5 Normal ammonium hydroxide at a temperature of from about 0° C. to about 90° C., or with moist or dry gaseous ammonia at a temperature of from about 50° C. to about 200° C.

The support matrix material combined with the crystalline zeolite in the initial step of the present method may be in the form of a gel, if desired, and the relative proportion of zeolite component and support matrix material component, on an anhydrous basis, may vary with the zeolite content ranging from about 25 to about 75 weight percent of the dry composite. Extrusion of the composite is preferred at this point because it results in a more intimate mixture of components.

Of the high silica zeolite materials advantageously treated in accordance herewith, zeolites ZSM-5, ZSM-11, ZSM-5/ZSM-11 intermediate, ZSM-12, ZSM-23, ZSM-35, ZSM-38 and ZSM-48 are particularly noted. ZSM-5 is described in U.S. Pat. Nos. 3,702,886 and Re 29,948, the entire contents of each being hereby incorporated by reference herein. ZSM-11 is described in U.S. Pat. No. 3,709,979, the entire teaching of which is incorporated herein by reference. ZSM-5/ZSM-11 intermediate is described in U.S. Pat. No. 4,229,424, the entire contents of which are incorporated herein by reference. ZSM-12 is described in U.S. Pat. No. 3,832,449, the entire contents of which are incorporated herein by reference. ZSM-23 is described in U.S. Pat. No. 4,076,842, the entire teaching of which is incorporated herein by reference. The entire contents of U.S. Pat. Nos. 4,016,245 and 4,046,859, described ZSM-35 and ZSM-38, respectively, are incorporated herein by reference. ZSM-48 is described in U.S. Pat. No. 4,397,827, the entire teaching of which is incorporated herein by reference.

In general, organic compounds such as, for example, those selected from the group consisting of hydrocarbons, alcohols and ethers, are converted to conversion products such as, for example, aromatics and lower molecular weight hydrocarbons, over the activity enhanced supported crystalline zeolite prepared as above by contact under organic compound conversion conditions including a temperature of from about 100° C. to about 800° C., a pressure of from about 0.1 atmosphere (bar) to about 200 atmospheres, a weight hourly space velocity of from about 0.08 hr$^{-1}$ to about 2000 hr$^{-1}$ and a hydrogen/feedstock organic compound mole ratio of from 0 (no added hydrogen) to about 100.

Such conversion processes include, as non-limiting examples, cracking hydrocarbons to lower molecular weight hydrocarbons with reaction conditions including a temperature of from about 300° C. to about 800° C., a pressure of from about 0.1 atmosphere (bar) to about 35 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with rection conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with rection conditions including a temperature of from about 275° C. to about 600° C., a pressure of from about 0.5 atmosphere to about 50 atmospheres and a liquid hourly space velocity of from about 0.5 to about 100; isomerizing xylene feedstock components to product enriched in p-xylene with reaction conditions including a temperature from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with rection conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In practicing a particularly desired chemical conversion process, it may be useful to incorporate the above-described activity enhanced material with additional matrix comprising another material resistant to the temperature and other conditions employed in the process. Such matrix material is useful as a binder and imparts additional resistance to the catalyst for the severe temperature, pressure and reactant feed stream velocity conditions encountered in many cracking processes.

Useful additional matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families which include the subbentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing additional matrix materials, the catalyst employed herein may be composited with an additional porous matrix material such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The additional matrix may be in the form of a cogel. The relative proportions of activity enhanced supported zeolite component and additional matrix, on an anhydrous basis, may vary widely with the zeolite content of the supported zeolite component ranging from about 1 to about 99 percent by weight and more usually in the range of about 5 to about 80 percent by weight of the total dry composite.

The following examples will illustrate the novel method of the present invention.

EXAMPLE 1

Zeolite ZSM-5 was prepared from a reaction mixture containing tetraalkylammonium ions. It had a silica-to-alumina mole ratio of about 26,000:1 (65 ppm framework alumina, 110 ppm bulk alumina and 0.23 percent sodium).

EXAMPLE 2

A 0.6 gram sample of the pure zeolite of Example 1 was vacuum impregnated with 4 weight percent aqueous hydrogen fluoride (2 Normal) solution for reaction at a temperature of 25° C. After 30 minutes reaction time, the zeolite material was dried at 130° C. and treated three times with 1N NH$_4$NO$_3$ solution, each treatment followed with water washing. The zeolite product of this example was calcined at 538° C. for 30 minutes in air.

EXAMPLE 3

A 0.6 gram sample of pure gamma-alumina was reacted with hydrogen fluoride as in Example 2. A 0.3 gram portion of the hydrogen fluoride reacted alumina was dried at 130° C. and treated by hydrolysis by contact with liquid water at ambient temperature for 2 hours and then calcined at 538° C. for 30 minutes.

EXAMPLE 4

The remaining 0.3 gram portion of the hydrogen fluoride reacted alumina of Example 3 was dried at 130° C. and treated with NH$_4$NO$_3$ as in Example 2. The alumina product of this example was calcined at 538° C. for 30 minutes.

EXAMPLE 5

An aliquot of 65 parts of the pure zeolite of Example 1 was combined and extruded with 35 parts of pure gamma-alumina (the same alumina as used in Example 3). The extrudate was reacted with hydrogen fluoride as in Example 2, dried at 130° C. and treated with 1N NH$_4$NO$_3$ solution three times followed each time by water washing. The extrudate product of this example was calcined for 30 minutes at 538° C.

EXAMPLE 6

A sample of each final product for Examples 1 through 5 was subjected to the Alpha Test, hereinafter defined, to measure catalytic activity. The results of this test are listed below:

| Product of Example | Product Description | Alpha Value |
| --- | --- | --- |
| 1 | Pure Zeolite | 0.015 |
| 2 | Treated Pure Zeolite | 0.2 |
| 3 | Treated Pure Alumina (with Hydrolysis) | 8 |
| 4 | Treated Pure Alumina (with ammonium salt treatment) | 10 |
| 5 | Treated Extrudate (present method) | 101 |

It is observed from the above results that the present method is highly useful for enhancing acid catalytic activity of crystalline zeolites, including those having a silica-to-alumina mole ratio greater than 100, which have, in turn, been composited and extruded with an alumina support matrix, the composite being reacted with a dilute aqueous solution of hydrogen fluoride under controlled conditions, the reacted composite being thereafter suitably treated and calcined.

EXAMPLE 7

A zeolite is prepared from a reaction mixture containing trimethyl[6-(trimethylarsonio)hexyl]ammonium ions. A sample of the zeolite, having a silica-to-alumina mole ratio of greater than about 500, is composited with alumina and reacted with hydrogen fluoride as in Example 2. The hydrogen fluoride reacted composite is dried at 130° C. and hydrolyzed by contact with liquid water at ambient temperature for 2 hours and then treated by ammonolysis involving contact with ammonia at 150° C. for 30 minutes. The final composite product is then calcined at 538° C. for 30 minutes in air. The original pure zeolite of this example exhibits an Alpha Value of less than 1, while the final calcined composite provides an Alpha Value of about 100.

As is known in the art, the Alpha value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (rate constant=0.016). The Alpha Test is described in U.S. Pat. No. 3,354,078 and in The Journal of Catalysis, Vol. IV, pp. 522-529 (August 1965).

What is claimed is:

1. A process for converting a feedstock comprising hydrocarbon compounds to conversion products comprising hydrocarbon compounds of lower molecular weight than feedstock hydrocarbon compounds which comprises contacting said feedstock at conversion conditions with a catalyst composition comprising a supported crystalline zeolite, said zeolite having an initial silica-to-alumina mole ratio greater than about 100, prepared by a method which comprises compositing said crystalline zeolite with alumina, reacting the composite with a dilute aqueous solution of hydrogen fluoride of from about 0.1 to about 5 Normal at a temperature of from about 0° C. to about 30° C. for a time of less than about 60 minutes, drying the hydrogen fluoride reacted composite, treating the dried hydrogen fluoride reacted composite by contact with an ammonium salt solution, by hydrolysis or ammonolysis, and calcining the resulting material at a temperature of from about 200° C. to about 600° C.

2. The process of claim 1 wherein said zeolite has a silica-to-alumina mole ratio greater than about 500.

3. The process of claim 1 wherein said dried hydrogen fluoride reacted composite is treated by contact with an ammonium salt solution.

4. The process of claim 3 wherein the ammonium salt is selected from the group consisting of ammonium nitrate, ammonium sulfate and ammonium chloride.

5. The process of claim 4 wherein said ammonium salt is ammonium nitrate.

6. The process of claim 1 wherein said composite is formed as an extrudate prior to said reacting with a dilute aqueous solution of hydrogen fluoride.

7. The process of claim 6 wherein said zeolite has a silica-to-alumina mole ratio greater than about 500.

8. The process of claim 6 wherein said dried hydrogen fluoride reacted extrudate is treated by contact with an ammonium salt solution.

9. The process of claim 1 wherein said dried hydrogen fluoride reacted composite is treated by hydrolysis.

10. The process of claim 1 wherein said dried hydrogen fluoride reacted composite is treated by ammonolysis.

11. The process of claim 6 wherein said dried hydrogen fluoride reacted extrudate is treated by hydrolysis.

12. The process of claim 6 wherein said dried hydrogen fluoride reacted extrudate is treated by ammonolysis.

13. The process of claim 1 wherein said zeolite has the structure of ZSM-5, ZSM-11, ZSM-5/ZSM-11 intermediate, ZSM-12, ZSM-23, ZSM-35, ZSM-38 or ZSM-48.

14. The process of claim 13 wherein said zeolite has the structure of ZSM-5 or ZSM-11.

15. The process of claim 6 wherein said zeolite has the structure of ZSM-5, ZSM-11, ZSM-5/ZSM-11 intermediate, ZSM-12, ZSM-23, ZSM-35, ZSM-38 or ZSM-48.

16. The process of claim 15 wherein said zeolite has the structure of ZSM-5 or ZSM-11.

17. The process of claim 1 wherein said conversion conditions include a temperature of from about 300° C. to about 800° C., a pressure of from about 0.1 atmosphere to about 35 atmospheres and a weight hourly space velocity of from about 0.1 $hr^{-1}$ to about 20 $hr^{-1}$.

18. The process of claim 6 wherein said conversion conditions include a temperature of from about 300° C. to about 800° C., a pressure of from about 0.1 atmosphere to about 35 atmospheres and a weight hourly space velocity of from about 0.1 $hr^{-1}$ to about 20 $hr^{-1}$.

19. A process for converting a feedstock comprising hydrocarbon compounds to conversion products comprising hydrocarbon compounds of lower molecular weight than feedstock hydrocarbon compounds which comprises contacting said feedstock at conversion conditions with a catalyst composition comprising a supported crystalline zeolite, said zeolite having an initial silica-to-alumina mole ratio greater than 100 and the structure of zeolite ZSM-5, said catalyst composition being prepared by a method which comprises compositing said crystalline zeolite with alumina, reacting the composite with a dilute aqueous solution of hydrogen fluoride of from about 0.1 to about 5 Normal at a temperature of from about 0° C. to about 30° C. for a time of less than about 60 minutes, drying the hydrogen fluoride reacted composite, treating the dried hydrogen fluoride reacted composite by contact with an ammonium salt solution, by hydrolysis or ammonolysis, and calcining the resulting material at a temperature of from about 200° C. to about 600° C.

* * * * *